March 29, 1960 R. F. TABER 2,930,236
PRESSURE MEASURING INSTRUMENT FOR HIGH VELOCITY FLUIDS
Filed Dec. 31, 1956
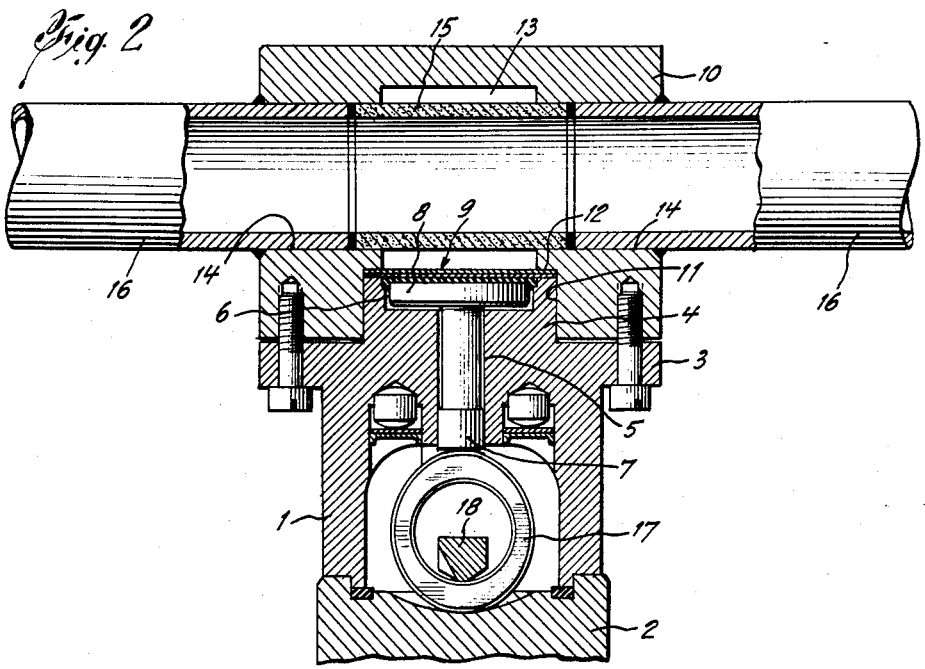
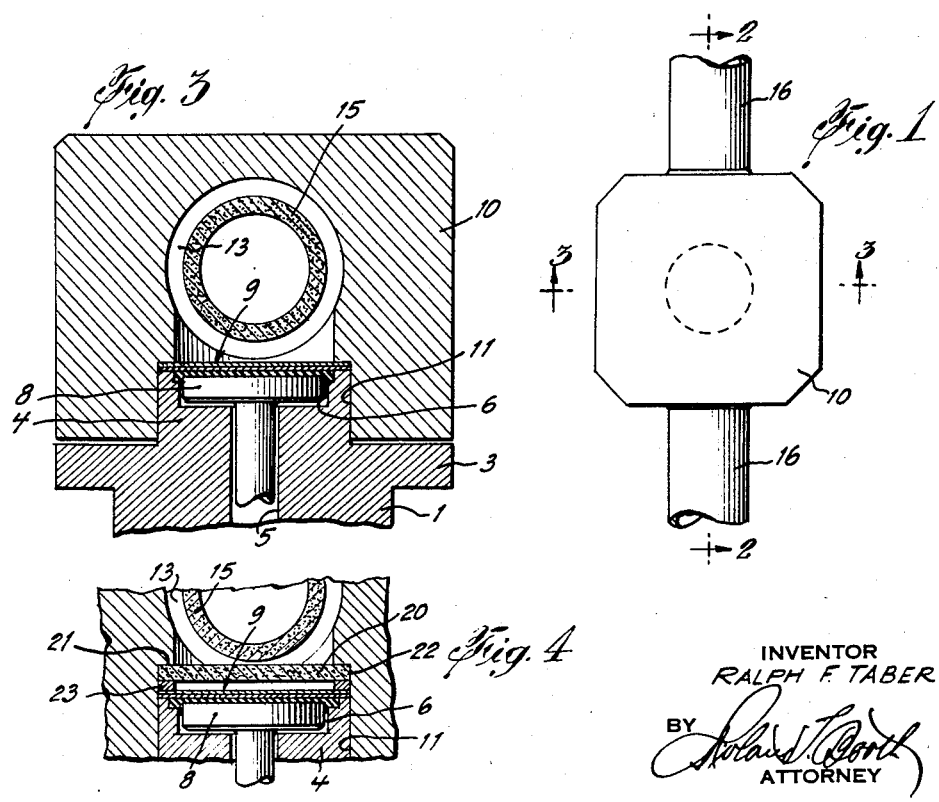
INVENTOR
RALPH F. TABER
BY
ATTORNEY United States Patent Office 2,930,236
Patented Mar. 29, 1960

2,930,236

PRESSURE MEASURING INSTRUMENT FOR HIGH VELOCITY FLUIDS

Ralph F. Taber, North Tonawanda, N.Y.

Application December 31, 1956, Serial No. 631,787

5 Claims. (Cl. 73—420)

This invention relates to a pressure measuring instrument for measuring fluid pressures flowing at high velocities and transmitting electrical signals to various types of indicators, recorders and computers.

The invention provides a resistance type strain gauge, or similar stress measuring instrument or transmitter for measuring fluid pressure variations having an end member formed with a tubular passage for fluid flow, a chamber communicating with the passage, pressure responsive means in the instrument, and porous means between the pressure responsive means and the tubular passage so that fluid may flow through the passage and the porous means into the chamber for operating the pressure responsive means. The porous means is arranged in the end member for cooperation to form part of the tubular passage and facilitate high velocity uninterrupted fluid flow through the end member with substantial elimination of turbulence in the fluid while providing for sufficient fluid flow therethrough to the pressure responsive means in the instrument so variations in pressure may be measured. The porous means also eliminates passage of dirt and other foreign matter from the fluid passage into the chamber and the pressure responsive barrier in the instrument.

The invention provides a porous barrier in a chamber formed in the end member of a pressure measuring instrument, such as porous stainless steel, porous bronze, or a porous ceramic for substantially eliminating turbulence in the fluid flowing through the end member by presenting a substantially smooth surface to the fluid, having sufficient porosity to pass fluid into a chamber for engaging and operating pressure measuring means, and at the same time, filtering the fluid to prevent passage of foreign matter into the pressure measuring means.

The invention provides an instrument having an end member formed with a fluid passage of tubular form in which fluid conduits may be suitably connected to the end member in the passage and aligned in end to end coincident relation with a porous tubular member. The end member is formed with a chamber about an intermediate portion of the porous member which opens through one end of the end member. The body of the instrument has a cylindrical projection on one end slidably engaging in an enlarged portion of said chamber and seating against a shoulder on the end member so that body and end member may be secured together in sealed relation. The projection of the body houses a portion of the pressure measuring means of the instrument which is exposed to fluid pressure in the chamber. The end member and body are detachably secured together in any suitable manner and the electrical pressure sensing means having portions housed in the body may be of the resistance strain gauge type or any other type useful in measuring high velocity fluid pressure variations.

In the drawing:
Fig. 1 is a plan view of the instrument.
Fig. 2 is a vertical cross-section taken on line 2—2 of Fig. 1, and having portions omitted.
Fig. 3 is a vertical fragmentary cross-section taken on line 3—3 of Fig. 1.

Fig. 4 is a fragmentary detail view similar to Fig. 3, showing a slightly modified construction.

The invention uses a conventional type of instrument for measuring fluid pressure variations particularly adapted to measuring pressures in fluids travelling at high velocity. Such an instrument may be constructed in the manner generally shown in the drawing and as shown in the copending application Serial No. 631,788 of Roger E. Dumas for improvements in Pressure Measuring Instrument filed on even date herewith.

This application discloses an example of a resistance type strain gauge measuring instrument with which the invention is shown in combination. The instrument has a body 1 with a base 2 detachably secured thereto. Body 1 is formed at the opposite end with an attaching flange 3 and a cylindrical projection 4. The body has a passage 5 opening into cylindrical recess 6 movably receiving force transmitting member 7.

A flexible barrier 9 is mounted on the end of cylindrical projection 4 and may be formed of a seal, a vapor barrier, and a resilient button. The resilient button is engaged with cylindrical plate portion 8 on member 7 while the seal is on the opposite side of the vapor barrier. An end member 10 is formed with a cylindrical recess 11 slidably receiving cylindrical projection 4 on body 1 and flexible barrier 9 for seating the periphery of the barrier on seat 12 adjacent chamber 13. Chamber 13 in said end member has one side open through recess 11 which is closed by said barrier with the seal portion of the barrier exposed to fluid in the chamber.

End member 10 is formed with a cylindrical bore or transverse passage 14 opening into chamber 13 at opposite sides. A porous tube 15 of suitable material, such as porous stainless steel, porous bronze, or a porous ceramic, has opposite ends mounted in bore 14, as shown in Fig. 2, with the portion intermediate the ends extending through chamber 13 so fluid passing through tube 15 will also have a portion flow through the pores of the tube to fill chamber 13. Tubular fluid conduits 16 of the same size as tube 15 have the ends mounted in bore 14 of the end member and sealed therein. Conduits 16 are also sealed at the inner ends in bore 14 against the ends of tube 15. This provides a smooth uninterrupted composite conduit for fluid flow through end member 10 at high velocity without creating undesirable turbulence in the fluid that would cause serious error in the pressure measurement.

Porous stainless steel has been found suitable for use in the manufacture of tube 15 because it resists corrosion and consequent closing of the pores. The pores will allow free flow of sufficient fluid into chamber 13 so that variations in fluid pressure will be freely transmitted to the fluid in chamber 13 for moving barrier 9 and member 7 for flexing sensing ring 17 so the pressure variations may be measured. The porous insert has a smooth interior finish and the pores in tube 15 are not sufficiently large to produce sufficient turbulence in fluid flowing through it at high velocity to be objectionable.

Sensing ring 17 has one portion rigidly attached to base 2 by retaining bar 18, while the diametrically opposite portion engages the end of force transmitting member 7 for operation in a manner such as that disclosed in the aforementioned pending application. Suitable means, such as resistance type strain gauges (not shown) cooperate with the portions of ring 17 at right angles to the portions engaging member 7, and base 2, for measuring variations in fluid pressure in said conduits in a manner well known in the art.

In the operation of the instrument, fluid in tube 15 will pass through small pores and fill chamber 13. The pores are very small so they will not affect the high velocity flow through the tube. Variations in fluid pressure are transmitted through the pores in the tube to the fluid in chamber 13 and to barrier 9 for transmission to the sensing ring for operating electrical measuring, registering, recording or transmitting mechanism. The variations in fluid pressure will cause fluid flow back and forth through the pores in tube 15 and thereby flush the pores of foreign matter for keeping them open and clean.

Where it is found desirable to additionally filter the fluid in chamber 13 before it contacts the seal portion of flexible barrier 9, provision may be made for inserting a porous disc 20, as shown in Fig. 4. A seat 21 is provided at the inner end of cylindrical recess 22. The marginal portion of disc 20 will engage seat 21. A spacing ring 23 slidably engages in cylindrical recess 22. One end of ring 23 engages the marginal portion of disc 20 while the opposite end provides a seat for the marginal portion of barrier 9. When the end of the cylindrical projection on the body is assembled with the end member, the disc and barrier will be assembled in efficient sealed relation. The pores in the disc will provide fluid flow through the disc to barrier 9. Fluctuations in fluid pressure are transmitted through the disc to the barrier while variations in pressure provide fluid flow back and forth through the pores in the disc and prevent clogging.

The invention claimed is:

1. In a pressure measuring instrument having a casing and pressure sensing means in said casing, the combination of an end member on said casing, said end member having a chamber formed therein and ports communicating with said chamber having tubular conduits secured therein in aligned relation, said chamber communicating with said pressure sensing means so variations in pressure may be measured thereby, and a porous tube extending across said chamber with opposite ends mounted in said casing in said ports in aligned relation with said conduits, said conduits and tube having a substantially uniform size of interior passage and continuous smooth inner wall surfaces, whereby fluid may pass at high velocity through said conduits and porous tube and may pass through said porous tube to fill said chamber and operate said sensing means according to variations in fluid pressure flowing through said tube without causing turbulence in said fluid.

2. A pressure measuring instrument comprising a casing having a body portion and a detachable end member, pressure sensing means mounted in said body portion, said pressure sensing means being in communication with a chamber formed in said end member, a porous tube having the intermediate portion extending across said chamber and opposite ends mounted in the side portions of said end member, and said end member having opposite sides formed with openings extending in aligned relation to said porous tube for receiving tubular conduits therein with the interior surfaces of said conduits and tube being smooth, of uniform size and substantially continuous, whereby fluid flow through said porous tube at high velocity will be uninterrupted and will fill said chamber for operating said sensing means according to variations in pressure in said tube and without creating objectionable turbulence in the fluid flowing therethrough.

3. An instrument as claimed in claim 2 wherein said porous tube is formed of porous stainless steel.

4. An instrument of the character claimed in claim 2, wherein a porous disc is mounted in the end member and extends across the chamber between the tube and body for filtering fluid in the portion of said chamber adjacent to and operating the sensing means.

5. A pressure measuring instrument comprising a casing having a body, said body having a flange on one end and a projection extending beyond said flange, said projection having a recess operably mounting a member of a pressure sensitive measuring means, an end member having a chamber formed therein opening into a recess slidably receiving said projection, said end member having a shoulder engaged by and seating the end of said projection in assembled relation of said body and member, means rigidly attaching said end member to said body engaging said flange, said end member being formed with a tubular bore extending transversely from side to side thereof and opening into said chamber, a porous tubular member having a smooth inner surface and opposite ends secured to said end member in said bore at opposite sides of said chamber with the intermediate portion extending through said chamber, and means for connecting tubular fluid conduits to said end member in coincident end to end relation with said porous member to form an uninterrupted smooth continuous passage of uniform size for fluid flow, whereby fluid may pass through said fluid conduits and porous member at high velocity without creating unwanted turbulence and at the same time pass through the porous member into said chamber for actuating said pressure sensitive measuring means so variations in fluid pressure may be measured.

References Cited in the file of this patent

UNITED STATES PATENTS

| | | |
|---|---|---|
| 1,577,909 | Kath | Mar. 23, 1926 |
| 2,147,108 | Rylsky | Feb. 14, 1939 |
| 2,515,394 | Clarkson | July 18, 1950 |
| 2,755,660 | Kammermeyer et al. | July 24, 1956 |